US007068946B2

(12) United States Patent
Gnauck et al.

(10) Patent No.: US 7,068,946 B2
(45) Date of Patent: Jun. 27, 2006

(54) MODULATION SCHEME FOR TEDONS

(75) Inventors: Alan H. Gnauck, Middletown, NJ (US); Antonio Mecozzi, Rome (IT); Mark Shtaif, Fort Lee, NJ (US); Jay Wiesenfeld, Lincroft, NJ (US)

(73) Assignee: AT&T Corp., Bedminster, NJ (US)

( * ) Notice: Subject to any disclaimer, the term of this patent is extended or adjusted under 35 U.S.C. 154(b) by 478 days.

(21) Appl. No.: 09/875,032

(22) Filed: Jun. 7, 2001

(65) Prior Publication Data

US 2002/0126359 A1 Sep. 12, 2002

Related U.S. Application Data

(60) Provisional application No. 60/263,590, filed on Jan. 23, 2001.

(51) Int. Cl.
*H04B 10/04* (2006.01)
(52) U.S. Cl. .................. 398/183; 398/182; 398/186; 398/189; 398/190; 398/191; 398/192; 398/202; 398/208; 398/214; 398/140; 398/141; 398/159
(58) Field of Classification Search ............... 398/25, 398/43, 98, 140, 141, 159, 173, 182, 183–191, 398/202–204, 192, 208, 214
See application file for complete search history.

(56) References Cited

U.S. PATENT DOCUMENTS

| 5,434,693 | A | | 7/1995 | Tanaka et al. |
| 5,608,560 | A | | 3/1997 | Abram et al. |
| 5,917,858 | A | | 6/1999 | Sinha et al. |
| 6,118,567 | A | * | 9/2000 | Alameh et al. ............ 398/191 |
| 6,151,149 | A | * | 11/2000 | Rybicki et al. ............ 398/191 |
| 6,295,318 | B1 | * | 9/2001 | Wingard .................... 375/239 |
| 6,341,023 | B1 | * | 1/2002 | Puc .............................. 398/79 |
| 6,384,945 | B1 | * | 5/2002 | Hakimi et al. ............. 398/140 |
| 6,442,200 | B1 | * | 8/2002 | Fukui ......................... 375/239 |
| 6,580,538 | B1 | * | 6/2003 | Kartalopoulos ............. 398/79 |
| 6,661,975 | B1 | * | 12/2003 | Hall et al. .................. 398/180 |
| 6,850,709 | B1 | * | 2/2005 | Gfeller et al. .............. 398/118 |

FOREIGN PATENT DOCUMENTS

EP    0 300 771 A    1/1989

OTHER PUBLICATIONS

A. Mecozzi, C. B. Clausen and M. Shtaif, "System Impact of Intra-Channel Nonlinear Effects of Highly Dispersed Optical Pulse Transmission", IEEE Photonics Technology Letters, vol. 12, No. 12, Dec. 2000, pp. 1633-1635.
Waldman H et al: "Line Codes for Photonically Amplified Digital Links" Communications: The Key to Global Prosperity. Globecom 1996. Global Internet 96 Conference Record. London, Nov. 18-22, 1996, Global Telecommunications Conference(Globecom), New York, IEEE, US, vol. Supp, Nov. 18, 1996, pp. 82-86, XP000741692, ISBN: 0-7803-3337-3. The whole document. Relevant to claims 1-25.
PCT Search Report dated May 7, 2002 regarding European Patent Application No. 02001082.3.

* cited by examiner (Continued)

*Primary Examiner*—Hanh Phan

(57) ABSTRACT

A system and method for increasing transmission distance and/or transmission data rates using tedons and an encoding scheme to reduce the number of ones in a data signal is described. For example, the method for increasing transmission distance and transmission data rate of a fiber optical communications link using tedons comprises the steps of encoding a data signal to be transmitted using an encoding scheme that reduces a number of ones in the data signal, transmitting the encoded data signal over the fiber optical communications link, receiving the encoded data signal and decoding the encoded data signal.

31 Claims, 1 Drawing Sheet

Tedon transmission line

Encoder    Transmitter                        Receiver    Decoder

MODULATION SCHEME FOR TEDONS

The present application claims priority to U.S. Provisional No. 60/263,590 filed Jan. 23, 2001.

FIELD OF THE INVENTION

The present invention relates to the field of optical communications systems and particularly to a method for reducing the nonlinear impairments in optical transmission systems.

BACKGROUND OF THE INVENTION

Transmission of short optical pulses is emerging as the best choice in high bit-rate and/or long-distance systems. However, the pulses suffer from nonlinear intra-channel effects, which weaken the performance thereby reducing the distance or decrease the bit-rate.

Long-haul transmission of information with optical fibers and in-line optical amplifiers, using digital on/off transmission format, suffers from two main impairments. One is the presence of the amplified spontaneous emission (ASE) noise of the amplifiers. A way of combating ASE noise is the use of high power signals, in which ones are represented by pulses with energy high enough to be faithfully detected at the receiver side. The second impairment is the signal distortion caused by optical nonlinearity, chiefly the Kerr effect. Optical nonlinearities can be counteracted by reducing the signal power as much as possible. The signal power that permits the achievement of the maximum distance can then be determined by a compromise between the two conflicting requirements of signal power and optical nonlinearity. Usually, it is determined by increasing the power of the signal up to a point where optical nonlinearity increases so much that it distorts the signal beyond an acceptable level. At the optimum power, the system is simultaneously limited by amplified spontaneous emission noise and by the nonlinearity. Indeed, if the transmission system were limited only by the spontaneous emission noise, increasing the power would permit an increase in the distance and if the transmission system were limited only by the optical nonlinearity, reducing the power would permit an increase in the distance.

SUMMARY OF THE INVENTION

Dispersion describes how a signal is distorted due to the various frequency components of the signal having different propagation characteristics. Specifically, dispersion is the degree of scattering in the light beam as it travels along a fiber span. Dispersion can also be caused by the frequency dependence of the group velocity of a light signal propagating inside a fiber.

It is well known that the capacity of a binary channel in which the noise is neglected is $$C = -P_1 \log_2 P_1 - P_0 \log_2 P_0 \quad (1)$$

where $P_0$ and $P_1$ are the probabilities of transmitting either one of the two symbols. In binary transmission, the maximum capacity of the channel is reached when the probability of the two symbols is equal, and is C=1 bit per symbol. Recently, it has been proposed that the use of short pulses with low duty-cycle, dubbed tedons in the scientific literature, permits achievement of unprecedented transmission distances at very high bit-rates, 40 Gbps and more. Tedons are pulses that, because of their very large bandwidth and therefore small dispersion distance, are rapidly dispersed after they are launched into the fiber. The integrity of the pulses is then restored at the receiver by the use of dispersion compensation techniques. With tedons, dispersion compensation may also be periodically performed along the link, in general at the amplifier locations, or immediately after the transmitter. The concept of spreading the pulses as far as possible and as quickly as possible in the time domain, creating a rapidly varying intensity pattern, in order to combat the impact of nonlinearity represents such a big shift from standard dispersion-managed approaches that a specific term "tedon-transmission" has been coined in the art to represent this scheme.

It is, therefore, an object of the present invention to increase the transmission distance of a communications link using tedons and an encoding scheme that reduces the number of ones transmitted.

A further object of the present invention is to increase the data rate of a communications link using tedons and an encoding scheme that reduces the number of ones transmitted.

BRIEF DESCRIPTION OF THE DRAWINGS

The invention is best described with reference to the detailed description and the following figure, where.

DETAILED DESCRIPTION OF THE PREFERRED EMBODIMENTS

Figure 1:
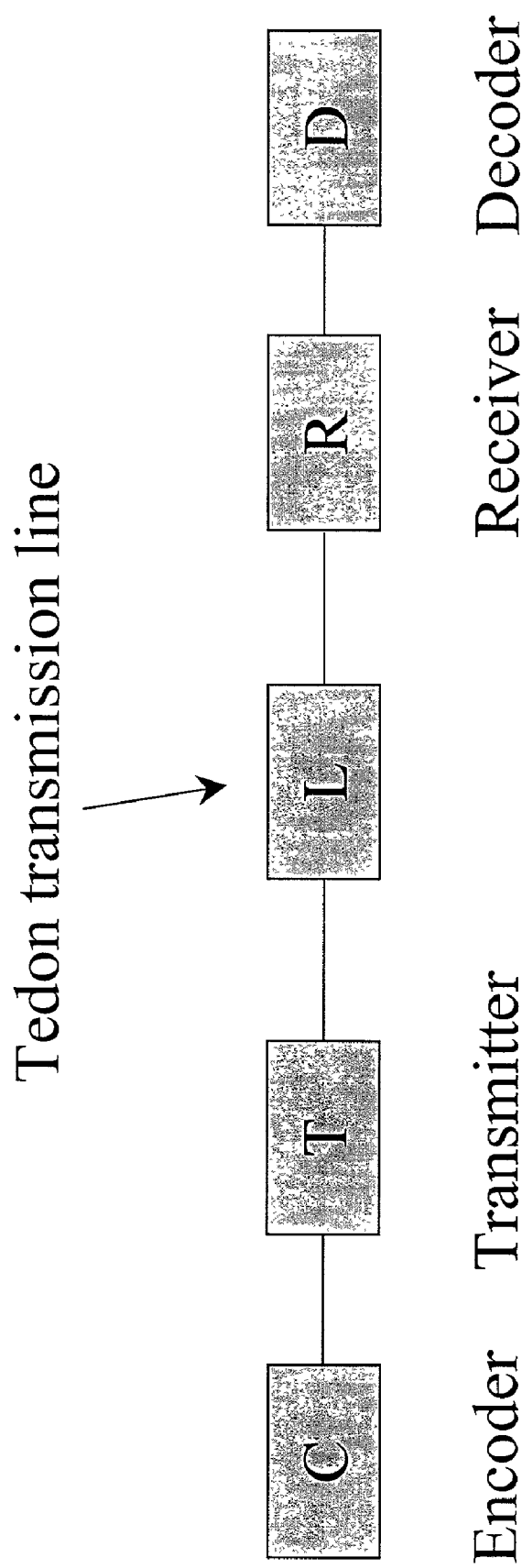
FIG. 1 depicts an optical transmission line using tedon transmission techniques.

Even with tedons, in spite of their intrinsic robustness, transmission performances are still limited by impairments due to optical nonlinearities. The peculiarity of tedons, however, is that the nonlinear impairments are approximately proportional to the average power, unlike most other transmission schemes in which the nonlinear impairments depend on the peak power of the signal (pulses representing logical ones). The above considerations lead us to a way of lowering the nonlinear impairments by reducing the number of logical ones transmitted and hence the average power of the signal. A proper encoding of the signal may easily accomplish this goal. The reduction of the number of ones reduces the capacity of the system compared to the case of a system in which ones and zeros are equally probable. The loss of capacity is, however, more than compensated by the improved performances of the system. The improved performances of the system can be used either to increase the reach of the transmission (for the same physical bit-rate) or to increase the information bit-rate (for the same reach).

Consider first the case in which the destination is beyond the reach or distance of the transmission system, limited by nonlinearity and ASE noise. With tedons after the first few hundreds of meters, the pulses are so dispersed that significant overlap occurs between pulses spaced many bits apart. Therefore, for the same initial pulse-width of the transmitted pulses, the shape of the intensity pattern after few hundreds of meters will not change if the probability of occurrence of a one is reduced by say half and simultaneously the power of the single pulse is doubled. Since the nonlinear impairments of the transmission depend on the dispersed intensity pattern, it is reasonable that reducing the occurrence of ones can reduce the nonlinear impairments of the transmission. Reducing the occurrence of ones will permit a longer transmission distance. It is important to note that in this case, since the power of ones is unchanged, the impairments due to ASE noise are not affected by the reduction of the occurrence of ones.

Consider now the case in which it is desired to transmit at the distance achieved with conventional transmission, but at a higher bit-rate. Increasing the bit-rate would require the same energy of ones (otherwise, the ASE noise would make the ones undetectable) and hence, because of the higher bit-rate, with conventional transmission (i.e., with probability of ones equal to the probability of zeros) the average power will become higher. With the proposed scheme, instead, the average power is kept constant by reducing the probability of occurrence of ones. To give an example, assume that the physical bit-rate is doubled and use a coding scheme for which the probability of occurrence of a one is 25% and of a zero 75%. The information bit-rate does not double like the bit-rate because of the reduction of the capacity caused by the reduction of C which, using equation (1) above, becomes 0.811. Nevertheless, the information bit-rate becomes 2×0.811=1.622 times the original information bit-rate. In general, for the same average power, the gain in information bit-rate that one obtains with probability $P_1$ of transmitting ones is $$g = \frac{0.5}{P_1}(-P_1 \log_2 P_1 - P_0 \log_2 P_0).$$

The gain is the product of two terms. The first, $0.5/P_1$, reflects the increase of the physical bit-rate when the probability of ones becomes $P_1$. The second, $(-P_1 \log_2 P_1 - P_0 \log_2 P_0)$, reflects the reduction of capacity caused by the reduced probability of transmitting ones. Note that g tends to infinity for $P_1 \to 0$, and it appears therefore that it is beneficial to use a physical bit-rate as high as possible, proportionally reducing the probability of occurrence of ones. This is only partially true, in the sense that using a higher physical bit-rate has a cost in terms of more expensive line terminals, which need to run at the increased physical bit-rate, not to mention the fact that increasing the physical bit-rate beyond a certain point requires a reduction of the pulsewidth of the transmitted pulses. Shorter pulses have larger bandwidth, and this implies loss of spectral efficiency if wavelength division multiplexing is used. Finally, one should also notice that the gain, for small $P_1$, tends to infinity only logarithmically, namely proportionally to $\log_2(1/P_1)$.

With the above example, we see that the use of a modulation format having 25% probability of a one and 75% probability of a zero has a capacity of 0.811, only 19% less than the case of a symmetric channel in which the ones and zeros are equally probable. Transmitting with such an asymmetric channel, using the bit period corresponding to 40 Gbps yields a signal having information bit/rate of 32.5 Gbps and an average power of a 20 Gbps signal. The reduction of the nonlinear impairments, proportional to the reduction of the average power, may be used to transmit a longer distance or to increase the system margin (bit-rate). At the price of such a moderate reduction of capacity, we achieve the reduction by half of the nonlinear impairments.

It is possible to conceive a code with a reduced probability of occurrence of ones. A possible method of encoding information is pulse position modulation (PPM). Assume that the time slots of the signal are divided into blocks of N slots, and that M pulses are transmitted in each of these blocks. To all different positions of the M pulses within the N possibilities, a different logical meaning is associated. The number of distinct messages that can be transmitted in each block is $$n = \frac{N!}{M!(N-M)!} \quad (2)$$

Consider the special case N=8 and M=2. These N and M are chosen just for the purpose of illustration, and are not intended to be practical; practical N and M are much larger. The two pulses can be placed everywhere in the 8 slots, and the total number of possibilities (distinct messages) from equation (2) above are n=28. Each distinct placement of the two pulses is associated a different symbol of an alphabet of 28 words. Transmitting with the conventional method, in which the presence or absence of a pulse represents a logical one or a logical zero, the number of possible messages is $2^8=256$. The number of messages is thus significantly reduced, by the factor 28/256. However, in terms of bits, the number of bits with the generalized PPM coding scheme is $\log_2 28 \sim 4.8$, in contrast with the 8 bits that can be transmitted, within the same time frame, with the conventional method. In this case, the reduction is about 40% in terms of bits, for a gain in terms of power of 50% (the average power is half in the generalized PPM scheme than in the conventional one, where the probability of occurrence of zeros and ones is one-half).

Computing the number of bits $$b = \log_2 n = \log_2 N! - \log_2 m! - \log_2 (N-M)! \quad (3)$$

the information content of a signal using such a code is $$C' = b/N = [\log_2 N! - \log_2 M! - \log_2 (N-M)!]/N \quad (4)$$

bit per symbol. For large M and N the information content of the equation above approaches the maximum information content that can be transmitted with the probability of transmission of a one of MIN probability. Indeed, assuming for instance N=64 and M=16 (corresponding to 25% probability that a one is transmitted), we have C'=0.76. For large N and M, the Stirling approximation of the factorial $m! \approx \sqrt{2\pi m} m^m e^{-m}$ may be used to obtain $$C' = -\left(1-\frac{M}{N}\right)\log_2\left(1-\frac{M}{N}\right) - \frac{M}{N}\log_2\frac{M}{N} + \rho \quad (5)$$

where the (negative) remainder $$\rho = \frac{1}{N}\log_2 \frac{N}{M(N-M)\sqrt{2\pi}} \quad (6)$$

goes to zero for M and N going to infinity with a finite constant ratio. Using PPM with M=256 and N=1024, we obtain $\rho=-8.7\times10^{-3}$ and therefore C'=0.81, practically equal to the maximum value of information content achievable with 25% probability of transmission of ones. This result can be proven rigorously as, with this scheme, the probability of transmission of a one is $P_1=M/N$, the probability of occurrence of a zero is $P_0=1-P_1=1-M/N$, and therefore, for large M and N $$C' \to -P_0 \log_2 P_0 - P_1 \log_2 P_1 = C \quad (7)$$

The novelty of the present invention is that this is the first optimization of the way the information is encoded in a signal to account for specific physical impairments of the optical transmission link.

Referring now to FIG. 1, which depicts an optical transmission line L using tedon transmission techniques described herein, the signal is encoded by an encoder C to reduce the probability of ones and then transmitted by a transmitter T over the optical transmission line. At the receiver R, the signal is received and passed to a decoder D to recreate the original signal.

The present invention may be implemented in hardware, software or firmware as well as Application Specific Integrated Circuits (ASICs) or Field Programmable Gate Arrays (FPGAs) or any other menas by which the functions and process disclosed herein can be effectively and efficiently accomplished or any combination thereof. The above means for implementation should not be taken to be exhaustive but merely exemplary and therefore, not limit the means by which the present invention may be practiced.

It should be clear from the foregoing that the objectives of the invention have been met. While particular embodiments of the present invention have been described and illustrated, it should be noted that the invention is not limited thereto since modifications may be made by persons skilled in the art. The present application contemplates any and all modifications within the spirit and scope of the underlying invention disclosed and claimed herein.

What we claim is:

1. A method for increasing transmission distance of a fiber optical communications link using tedons comprising the steps of:
    encoding a data signal to be transmitted using an encoding scheme that reduces a number of ones disproportionally relative to a number of zeros in said data signal; and
    transmitting said encoded data signal over said fiber optical communications link using said tedons.

2. The method according to claim 1, wherein said encoding scheme is pulse position modulation.

3. A method for increasing transmission distance of a fiber optical communications link using tedons comprising the steps of:
    receiving an encoded data signal from said fiber optical communications link using said tedons, wherein said encoded data signal was encoded by a transmitter using an encoding scheme that reduced a number of ones disproportionally relative to a number of zeros in a data signal; and
    decoding said encoded data signal.

4. The method according to claim 3, wherein said encoding scheme is pulse position modulation.

5. A method for increasing transmission distance of a fiber optical communications link using tedons comprising the steps of:
    encoding a data signal to be transmitted using an encoding scheme that reduces a number of ones disproportionally relative to a number of zeros in said data signal;
    transmitting said encoded data signal over said fiber optical communications link using said tedons;
    receiving said encoded data signal; and
    decoding said encoded data signal.

6. The method according to claim 5, wherein said encoding scheme is pulse position modulation.

7. A method for increasing transmission data rate of a fiber optical communications link using tedons comprising the steps of:
    encoding a data signal to be transmitted using an encoding scheme that reduces a number of ones disproportionally relative to a number of zeros in said data signal; and
    transmitting said encoded data signal over said fiber optical communications link using said tedons.

8. The method according to claim 7, wherein said encoding scheme is pulse position modulation.

9. A method for increasing transmission data rate of a fiber optical communications link using tedons comprising the steps of:
    receiving an encoded data signal from said fiber optical communications link using said tedons, wherein said encoded data signal was encoded by a transmitter using an encoding scheme that reduced a number of ones disproportionally relative to a number of zeros in a data signal; and
    decoding said encoded data signal.

10. The method according to claim 9, wherein said encoding scheme is pulse position modulation.

11. A method for increasing transmission data rate of a fiber optical communications link using tedons comprising the steps of:
    encoding a data signal to be transmitted using an encoding scheme that reduces a number of ones disproportionally relative to a number of zeros in said data signal;
    transmitting said encoded data signal over said fiber optical communications link using said tedons;
    receiving said encoded data signal; and
    decoding said encoded data signal.

12. The method according to claim 11, wherein said encoding scheme is pulse position modulation.

13. A method for increasing transmission distance and transmission data rate of a fiber optical communications link using tedons comprising the steps of:
    encoding a data signal to be transmitted using an encoding scheme that reduces a number of ones disproportionally relative to a number of zeros in said data signal;
    transmitting said encoded data signal over said fiber optical communications link using said tedons;
    receiving said encoded data signal; and
    decoding said encoded data signal.

14. The method according to claim 13, wherein said encoding scheme is pulse position modulation.

15. A system for increasing transmission distance of a fiber optical communications link using tedons comprising:
    an encoder for encoding a data signal to be transmitted using an encoding scheme that reduces a number of ones disproportionally relative to a number of zeros in said data signal; and
    a transmitter coupled to said encoder for transmitting said encoded data signal over said fiber optical communications link using said tedons.

16. The system according to claim 15, wherein said encoding scheme is pulse position modulation.

17. A system for increasing transmission distance of a fiber optical communications link using tedons comprising:
    a receiver for receiving an encoded data signal from said fiber optical communications link using said tedons, wherein said encoded data signal was encoded by a transmitter using an encoding scheme that reduced a number of ones disproportionally relative to a number of zeros in a data signal; and
    a decoder coupled to said receiver for decoding said encoded data signal.

18. The system according to claim 17, wherein said encoding scheme is pulse position, modulation.

19. A system for Increasing transmission distance of a fiber optical communications link using tedons comprising:
  an encoder for encoding a data signal to be transmitted using an encoding scheme that reduces a number of ones disproportionally relative to a number of zeros in said data signal;
  a transmitter coupled to said transmitter for transmitting said encoded data signal over said fiber optical communications link using said tedons;
  a receiver for receiving said encoded data signal; and
  a decoder coupled to said receiver for decoding said encoded data signal.

20. The system according to claim 19, wherein said encoding scheme is pulse position modulation.

21. A system for increasing transmission data rate of a fiber optical communications link using tedons comprising:
  an encoder for encoding a data signal to be transmitted using an encoding scheme that reduces a number of ones disproportionally relative to a number of zeros in said data signal; and
  a transmitter coupled to said encoder for transmitting said encoded data signal over said fiber optical communications link using said tedons.

22. The system according to claim 21, wherein said encoding scheme is pulse position modulation.

23. A system for increasing transmission data rate of a fiber optical communications link using tedons comprising:
  a receiver for receiving an encoded data signal from said fiber optical communications link using said tedons, wherein said encoded data signal was encoded by a transmitter using an encoding scheme that reduced a number of ones disproportionally relative to a number of zeros in a data signal; and
  a decoder coupled to said receiver for decoding said encoded data signal.

24. The system according to claim 23, wherein said encoding scheme is pulse position modulation.

25. A system for increasing transmission data rate of a fiber optical communications link using tedons comprising:
  an encoder for encoding a data signal to be transmitted using an encoding scheme that reduces a number of ones disproportionally relative to a number of zeros in said data signal;
  a transmitter coupled to said encoder for transmitting said encoded data signal over said fiber optical communications link using said tedons;
  a receiver for receiving said encoded data signal; and
  a decoder coupled to said receiver for decoding said encoded data signal.

26. The system according to claim 25, wherein said encoding scheme is pulse position modulation.

27. A system for increasing transmission distance and transmission data rate of a fiber optical communications link using tedons comprising:
  an encoder for encoding a data signal to be transmitted using an encoding scheme that reduces a number of ones disproportionally relative to a number of zeros in said data signal;
  a transmitter coupled to said encoder for transmitting said encoded data signal over said fiber optical communications link using said tedons;
  a receiver for receiving said encoded data signal; and
  a decoder coupled to said receiver for decoding said encoded data signal.

28. The system according to claim 27, wherein said encoding scheme is pulse position modulation.

29. A system for increasing transmission distance of a fiber optical communications link using tedons comprising:
  means for encoding a data signal to be transmitted using an encoding scheme that reduces a number of ones disproportionally relative to a number of zeros in said data signal;
  means for transmitting said encoded data signal over said fiber optical communications link using said tedons;
  means for receiving said encoded data signal; and
  means for decoding said encoded data signal.

30. A system for increasing transmission data rate of a fiber optical communications link using tedons comprising:
  means for encoding a data signal to be transmitted using an encoding scheme that reduces a number of ones disproportionally relative to a number of zeros in said data signal;
  means for transmitting said encoded data signal over said fiber optical communications link using said tedons;
  means for receiving said encoded data signal; and
  means for decoding said encoded data signal.

31. A system for increasing transmission distance and transmission data rate of a fiber optical communications link using tedons comprising:
  means for encoding a data signal to be transmitted using an encoding scheme that reduces a number of ones disproportionally relative to a number of zeros in said data signal;
  means for transmitting said encoded data signal over said fiber optical communications link using said tedons;
  means for receiving said encoded data signal; and
  means for decoding said encoded data signal.

* * * * *